United States Patent
Grant et al.

(10) Patent No.: US 6,895,988 B2
(45) Date of Patent: May 24, 2005

(54) SELF-ACTUATING CONTROL VALVE FOR A BED PAD OR SEAT PAD

(75) Inventors: Benton H. Grant, Stamford, CT (US); Kenneth A. Ward, Dorset, VT (US)

(73) Assignee: Grant Airmass Corporation, Stamford, CT (US)

( * ) Notice: Subject to any disclaimer, the term of this patent is extended or adjusted under 35 U.S.C. 154(b) by 187 days.

(21) Appl. No.: 10/435,089

(22) Filed: May 9, 2003

(65) Prior Publication Data

US 2004/0045601 A1 Mar. 11, 2004

Related U.S. Application Data

(60) Provisional application No. 60/409,636, filed on Sep. 10, 2002.

(51) Int. Cl.[7] ................................................. G05D 7/01
(52) U.S. Cl. ................. 137/119.01; 5/713; 137/119.02; 137/119.09; 297/284.6
(58) Field of Search ........................ 137/119.01, 119.02, 137/119.08, 119.09, 102, 106, 624.2; 5/713; 297/284.6

(56) References Cited

U.S. PATENT DOCUMENTS

| | | | | |
|---|---|---|---|---|
| 3,465,686 A | * | 9/1969 | Nugier | 417/403 |
| 3,495,620 A | | 2/1970 | Raimondi et al. | 137/529 |
| 3,527,248 A | | 9/1970 | Western-Pick | 137/552.5 |
| 3,592,230 A | | 7/1971 | Piroutek | 137/625.66 |
| 3,623,695 A | | 11/1971 | Hislop | 251/75 |
| 3,734,132 A | * | 5/1973 | Kuhnelt | 137/119.01 |
| 3,797,520 A | | 3/1974 | Lekarski et al. | 137/517 |
| 4,112,962 A | * | 9/1978 | Huff | 137/119.02 |
| 4,203,571 A | | 5/1980 | Ruchser | 251/31 |
| 4,285,268 A | * | 8/1981 | Deckler | 137/119.08 |
| 4,635,681 A | | 1/1987 | Boldish | 137/625.5 |
| 5,135,282 A | * | 8/1992 | Pappers | 297/284.6 |
| 5,272,778 A | | 12/1993 | Gore | 5/453 |
| 5,320,136 A | | 6/1994 | Morris et al. | 137/528 |
| 5,377,719 A | | 1/1995 | Gyllinder, et al. | 137/625.63 |
| 5,584,085 A | * | 12/1996 | Banko | 5/713 |
| 5,659,908 A | | 8/1997 | Nishino | 5/676 |
| 6,370,716 B1 | | 4/2002 | Wilkinson | 5/715 |

* cited by examiner

*Primary Examiner*—Stephen M. Hepperle
(74) *Attorney, Agent, or Firm*—St. Onge Steward Johnson & Reens LLC

(57) ABSTRACT

A fluid operated control valve for controlling fluid flow of a system which includes a first and a second fluid channels therein, the control valve includes: a hollow casing with closed first and second ends; a piston member slidably disposed within the casing and defining thereby within the casing a first chamber adjacent to the first end of the casing and a second chamber adjacent to the second end of the casing; a first magnet disposed adjacent the first chamber of the casing for attracting the piston member to a first terminal position; a second magnet disposed adjacent the second chamber of the casing for attracting the piston member to a second terminal position. The control valve further includes: an input port disposed adjacent to an intermediate location in the casing; a first output port disposed in the casing in fluid communication with the first chamber; a second output port disposed in the casing in fluid communication with the second chamber; wherein the control valve is adapted to alternately inflate and deflate the two fluid channels of the system through the ports in response to the reciprocal movement of the piston member. Pad systems utilizing the control valve are also disclosed.

30 Claims, 4 Drawing Sheets

SELF-ACTUATING CONTROL VALVE FOR A BED PAD OR SEAT PAD

This application claims the benefit of Provisional Application No. 60/409,636, filed Sep. 10, 2002.

FIELD OF THE INVENTION

The present invention relates generally to control valves for controlling fluid flow of a system. In particular, the present invention relates to fluid operable, self-actuating control valves usable for various systems such as pad systems (e.g., bed pad or seat pad systems) and comfort systems, etc.

BACKGROUND OF THE INVENTION

Bed pads and seat pads are sometimes employed in medical settings to prevent bed sores or used to reduce fatigue and provide comfort in situations where prolonged sitting or resting in one place is required. These devices function by repeatedly and alternately inflating and deflating adjacent air channels in the pad or cushion so that the supporting pressure on any one part of the human body is in constant change.

In such known pad systems, the directing of the required air pressure is accomplished by use of a timer operated by alternating current (e.g., 60 hz) and a valve which is electrically operated as directed by the timer. This dependence on alternating current is costly and a great disadvantage particularly in an application (such as a wheelchair or automobile) where alternating current is not available.

SUMMARY OF THE INVENTION

Accordingly, the present invention is directed to fluid operable, self-actuating control valves usable for various systems, such as pad systems (e.g., bed pad and seat pad systems) and comfort/cushion systems, etc. (collectively "amenity systems"). The control valves of the present invention do not use the alternating current electricity for actuation and may be inexpensive to produce.

In particular, the present invention requires no electricity at all for the cycling action needed to alternately inflate and deflate the two channels of the bed or seat pad. Of course, fluid supply (for example, air supply by the low pressure air pump) must use some energy source, but this can be direct current which is the only electrical source available in many applications. Even when applying in a pad system where the AC electricity (e.g., 110 v, 60 hz) is readily available, this invention may result in cost savings. The invention is therefore a simplification of the present art and results in cost savings for the manufacturer and therefore the consumer.

The present invention uses a piston which moves from one rest position to another rest position within a casing when the pressure difference between a pressurizing chamber and the other chamber reaches a predetermined level which overcomes the attracting force of a holding magnet. When this movement of the piston occurs, the channel that was previously being supplied fluid (e.g., air) now is allowed to vent out slowly, and the channel that was previously venting now gradually fills with fluid. Likewise, the cycle is repeated when the pressure difference in the chambers reaches a predetermined level dictated by the magnetic force.

The piston is preferably held against a stop by the attractive force between a magnet disposed adjacent the casing end and a soft-iron slug imbedded in the piston. Conversely, a soft-iron slug may be disposed within the casing and a magnet is imbedded in the piston. Alternatively, the soft iron in the piston may be omitted in the case the piston is made of a magnet-attractive material. There are two such magnets, one for each rest position.

Incoming fluid (e.g., air) is directed to one chamber of the invention or the other depending on the position of the piston. Preferably, a passageway (e.g., two conduits in the piston) and the o-rings positioned around the piston facilitate secured guiding of the operating fluid to the respective chamber which depends on the position. The cycle time can be controlled by controlling the aperture through which the incoming air must pass, and the release pressure is controlled by the rest position air gap between the holding magnet and the soft-iron slug on the piston. The cycle time can also be controlled by differentially pressurizing a pressurizing chamber and venting the other chamber to predetermined rates, in which switching of the piston occurs when the pressure differential overcomes the attracting force of the one then holding magnetic member.

In accordance with a preferred embodiment of the invention, a fluid operated control valve for controlling fluid flow of a system which includes a first and a second fluid channels therein, is disclosed. The control valve comprises: a hollow casing with closed first and second ends; a piston member slidably disposed within the casing and defining thereby within the casing a first chamber and a second chamber, each chamber having a volume variable depending upon the position of the piston member; a first magnetic member disposed adjacent the first casing end for attracting the piston member to a first terminal position; and, a second magnetic member disposed adjacent the second casing end for attracting the piston member to a second terminal position. The control valve of the invention further comprises: an input port disposed adjacent to an intermediate location in the casing for receiving operating fluid thereto; a first output port disposed in the casing in fluid communication with the first chamber; a second output port disposed in the casing in fluid communication with the second chamber; and, a passageway for alternately guiding the operating fluid from the input port to the first chamber and the second chamber depending upon the position of the piston member within the casing, the position of the piston being reciprocally moveable between the two terminal positions when the pressure difference between a pressurizing chamber and the other chamber reaches a pressure overcoming attracting force between the piston member and the one then-holding magnetic member. The control valve of the invention preferably includes a first vent port disposed between the input port and the first output port for venting fluid therethrough, and a second vent port disposed between the input port and the second output port for venting fluid therethrough.

In accordance with another preferred embodiment of the invention, an amenity system for use with a fluid source for providing operating fluid to the system, comprises: an amenity member including a first and a second fluid channels therein, and a control valve disposed in fluid communication with the fluid source and the fluid channels of the amenity member and for alternately inflating and deflating the fluid channels. The control valve of the invention includes: a hollow casing with closed first and second ends; a piston member slidably disposed within the casing and defining thereby within the casing a first chamber adjacent to the first end of the casing and a second chamber adjacent to the second end of the casing, each chamber having a volume variable depending upon the position of the piston member; a first magnetic member disposed adjacent the first chamber for attracting the piston member to a first terminal position; and, a second magnetic member disposed adjacent the second chamber for attracting the piston member to a second terminal position. The control valve of the invention further includes: an input port disposed adjacent to an intermediate location in the casing for receiving the operating fluid thereto from the fluid source; a first output port disposed in the first chamber in fluid communication with the first chamber and the first fluid channel of the amenity member; a second output port disposed in the second chamber in fluid communication with the second chamber and the second fluid channel of the amenity member; and a passageway for alternately guiding the operating fluid from the input port to the first chamber and the second chamber depending upon the position of the piston member within the casing, the position of the piston being reciprocally moveable between the two terminal positions when the pressure difference between a pressurizing chamber and the other chamber reaches a pressure overcoming attracting force between the piston member and the one then-holding magnetic mating member, thereby allowing alternate pressurizing of the fluid channels of the amenity member. The control valve of the invention preferably includes a first vent port disposed between the input port and the first output port for venting fluid therethrough, and a second vent port disposed between the input port and the second output port for venting fluid therethrough.

Other aspects, objects and features of the invention in addition to those mentioned above will be understood from the following detailed description provided in conjunction with the accompanying drawings.

DETAILED DESCRIPTION OF PREFERRED EMBODIMENTS

The present invention is described herein, particularly in conjunction with a bed or seat pad system. However, the invention is not limited thereto and may be applicable to various other systems including but without limitation to pad systems, comfort systems, cushion systems, air supply systems, medical systems etc. (referred collectively as "amenity systems") which include at least two fluid channels for alternately pressurizing in accordance with the principles and concepts described herein-after.

Figure 3:
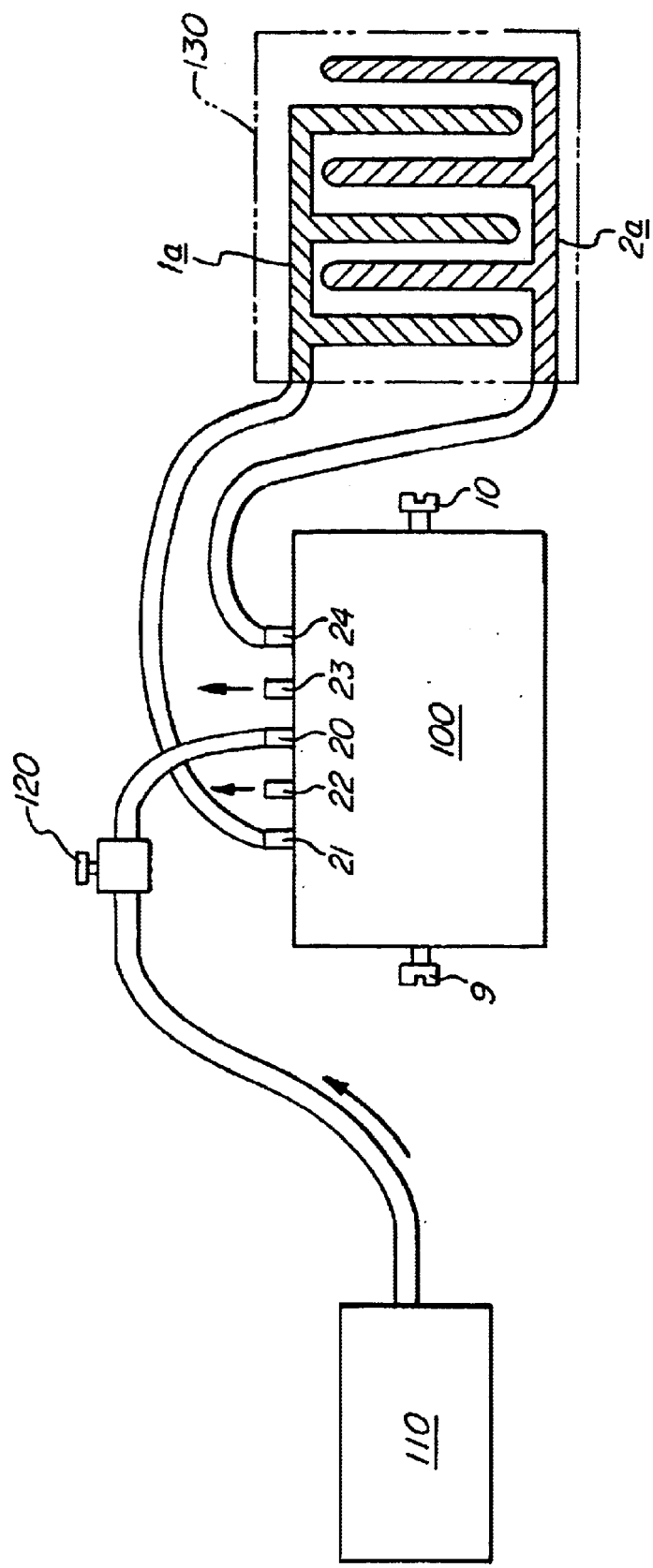
FIG. 3 shows how this invention is employed in combination with an air pump and a bed or seat pad.

FIG. 3 is a schematic representation illustrating how this invention is used in conjunction with a utility pad system (e.g., a bed pad or seat pad system). In order to produce the required pressure cycling to bed pad or seat pad 130, the invention takes fluid (such as air, gas, liquid, etc.) from the source 110 and directs it alternately to channel 1a or channel 2a as needed through fluid ports which will be described later in details. When fluid is not being provided to a channel, the invention provides means for a slow venting (emptying) of the fluid in that channel. Cycle time is controlled by adjustment of the fluid flow rate from the source or the vent rate of then-venting channel, for example by adjusting valve 120, etc. Maximum pressure in each channel (or pressure difference of the two channels) is controlled with the magnet adjustment screws 9 and 10 at each end of the control valve 100 of the invention.

Fluid control valve 100 of the invention consists basically of: a hollow casing 3 with closed ends 4 and 5, at least three ports (i.e., input port 20, output ports 21 and 24), a piston 6 which slides left and right within the casing, and two adjustable magnets 7 and 8 positioned adjacent the casing ends 4 and 5. Adjustment screws 9 and 10 are provided to adjust positioning of magnets 7 and 8. Soft-iron slugs 11 and 12 are provided to attract magnets 7 and 8, respectively. Conversely, the soft-iron slugs may be disposed within the casing and the magnets be imbedded in the piston. Alternatively, the soft iron in the piston may be omitted in the case the piston is made of a magnet-attractive material such as steel.

O-rings 13, 14 and 15 are used to seal off the space between the inside of the casing and the piston. The o-rings are of low durometer and moveable along the piston 6 upon the reciprocal movement of the piston within the casing 3. Preferably, they roll within the grooves provided instead of sliding. This produces a tight seal with low resistance to left-right motion. The end caps have protrusions on them which act as limits to the side-to-side motion of the piston.

Figure 1:
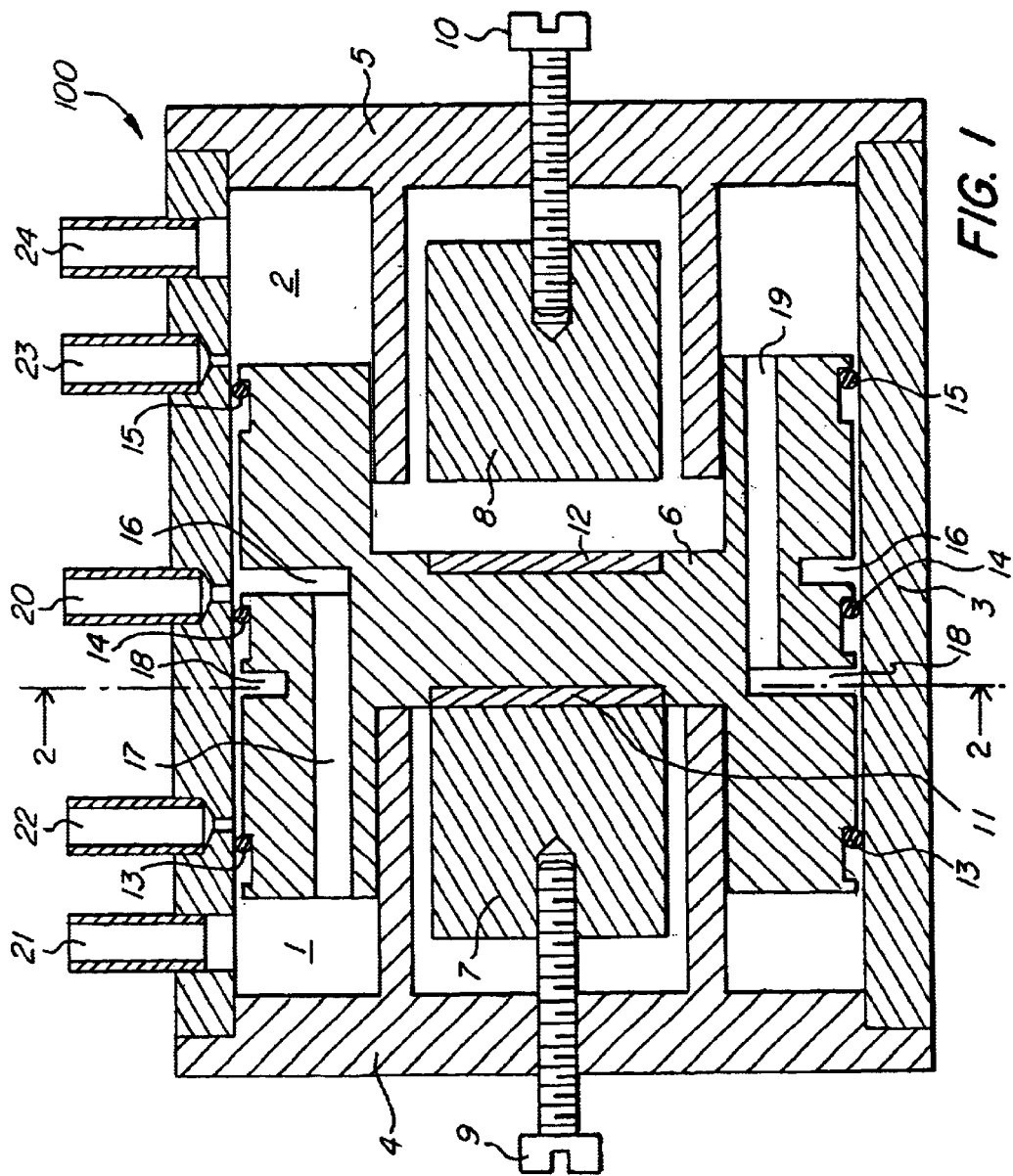
FIG. 1 shows a side view of this invention in cross-section with the piston at rest in its extreme left position.
Figure 2:
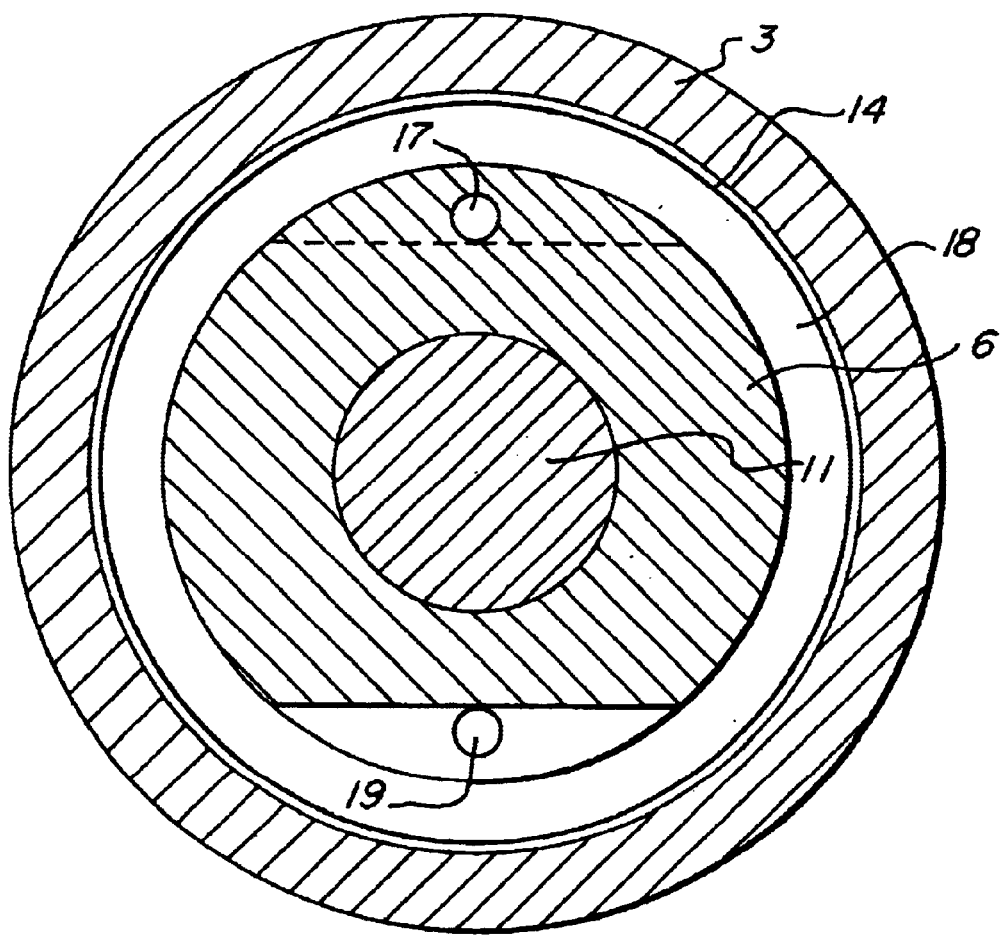
FIG. 2 is a slice perpendicular to FIG. 1 through the left groove in the piston, looking to the right.

A passageway is provides for alternately guiding the air from the input port to chambers 1 and 2 depending upon the position of the piston 6. For example, two fluid passageways (e.g., two circumferential grooves 16, 18 and two conduits 17, 19 respectively connected thereto) are provided in the piston 6 so that for instance when incoming fluid enters the right groove 16 as shown in FIG. 1, it passes through conduit 17 and is conducted into chamber 1. The left groove 18 is similarly fitted with a conduit 19 which conducts air into the right chamber 2 when the piston has moved to the right against its limit. Alternatively, it is also envisioned that various valve connections may be provide to accomplish the fluid passageway. Also, the passageway may be disposed in the casing 3 in association with a modified piston structure.

The magnet positions are adjusted so that they at most just touch the soft-iron slugs imbedded in the piston. Backing a magnet out reduces the holding force exerted by the magnet thereby reducing the air pressure required to break the piston loose from its rest position. No special rotational positioning or clocking of the piston in relation to the ports is required, and air is conducted into one of the grooves and around the piston to the appropriate conduit regardless of clocking.

Operation of this invention is further described herein assuming the piston is initially at rest against the left limit as depicted in FIG. 1. Fluid entering at port 20 is confined between o-ring 14 and o-ring 15 and conducted into groove 16 and thence into conduit 17 and chamber 1. As fluid enters chamber 1, it proceeds to channel 1a in the bed pad or seat pad 130 through port 21. Channel 1a gradually fills with air. As the pressure in channel 1a increases, the flow from chamber 1 to channel 1a subsides until a point is reached where the pressure in channel 1a approximately equals the pressure in chamber 1. As this pressure gradually rises, the total pressure difference between chamber 1 and chamber 2l rises until this pressure against the piston left wall exceeds the holding force of magnet 7. At this point, the piston breaks free from magnet 7 and the air pressure in chamber 1 causes the piston to be pushed to the right until it comes to rest against the right limit in chamber 2. When this is accomplished o-ring 13 will have rolled to the right of port 22, providing a small opening in the system through which chamber 1 and channel 1a can vent. At the same time o-ring 15 will have rolled to the right of port 23, thereby sealing off chamber 2, and o-ring 14 will have rolled to the right of port 20 causing air to be conducted into groove 18 and then into chamber 2. Air is now conducted into channel 2a through port 24 causing channel 2a to fill, repeating the entire process with piston 6 now in its right-hand rest position.

In accordance with one aspect of the invention, the control valve 100 has been designed so that the parts 3, 4, 5 and 6 can be molded in plastic and assembled easily and inexpensively. End caps 4 and 5 are identical parts and are press fits onto the ends of casing 3 and the three o-rings 13, 14 and 15 are sufficiently soft to accommodate small dimensional deviations in the fit of piston 6 within the casing 3. There is no rotational sensitivity, and thus all parts can be assembled without regard to the rotational orientation.

Figure 4:
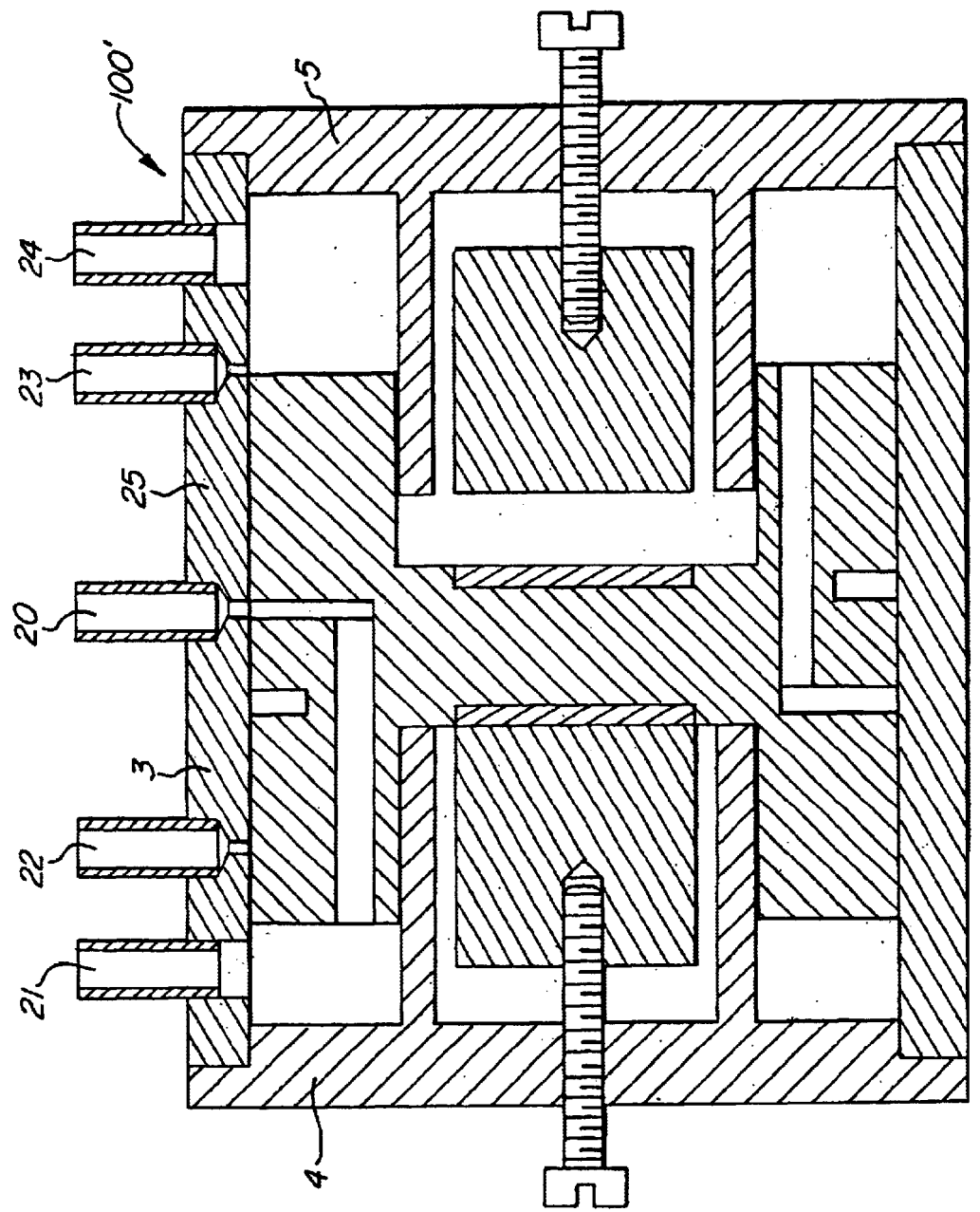
FIG. 4 shows a side view of an alternative embodiment of this invention in cross-section with the piston at rest in its extreme left position.

FIG. 4 illustrates an alternate embodiment of the invention which does not require o-ring seals therein. In this embodiment, piston 25 is fitted to hollow casing 3 with a minimum clearance (<0.001 in). This can be achieved most easily by making casing 3 and piston 25 out of metal and machining the parts to fit. Another way of accomplishing the required tight tolerances is to mold the casing with an undersize inner diameter and the piston with an oversized outer diameter and performing a final machining operation on the plastic parts to achieve the required fit. For this embodiment, a dimensionally stable plastic is essential. Without o-rings, the matching of the two parts is critical if the fit is too tight, the friction is too high and if the fit is too loose, air leakage will degrade performance by reducing the maximum achievable pressure in a channel. Despite the difficulties described above, an aluminum working model was built and tested with successful results using these principles.

Although the invention has been described and illustrated with respect to the exemplary embodiments thereof, it should be understood by those skilled in the art that various changes, omissions and additions may be made therein and thereto, without departing from the spirit and scope of the present invention.

What is claimed is:

1. A fluid operated control valve for controlling fluid flow of a system, the control valve comprising:
   a hollow casing with closed first and second ends;
   a piston member slidably disposed within the casing and defining thereby within the casing a first chamber and a second chamber, each chamber having a volume variable depending upon the position of the piston member;
   a first magnetic member disposed adjacent the first casing end for attracting the piston member to a first terminal position;
   a second magnetic member disposed adjacent the second casing end for attracting the piston member to a second terminal position;
   an input port disposed adjacent to an intermediate location in the casing for receiving operating fluid thereto;
   a first output port disposed in the casing in fluid communication with the first chamber;
   a second output port disposed in the casing in fluid communication with the second chamber; and
   a passageway for alternately guiding the operating fluid from the input port to the first chamber and the second chamber depending upon the position of the piston member within the casing, the position of the piston being reciprocally moveable between the two terminal positions when pressure difference between a pressurizing chamber and the other chamber reaches a pressure overcoming attracting force between the piston member and the one then-holding magnetic member.

2. The control valve of claim 1 further including a first vent port disposed between the input port and the first output port, and a second vent port disposed between the input port and the second output port, respectively, for venting fluid from the chambers.

3. The control valve of claim 1, wherein the passageway includes a pair of conduits for the alternate guiding of the fluid.

4. The control valve of claim 3, wherein the conduits are disposed in the piston member.

5. The control valve of claim 3, wherein the piston member further includes a first and a second grooves each disposed at least partially around the circumference of the piston member and respectively in communication with the first and the second conduits for guiding the operating fluid.

6. The control valve of claim 1, wherein the first and second magnetic members each include a magnet disposed within the respective chamber and a mating iron slug attached to the piston member.

7. The control valve of claim 6, wherein the magnets are adjustable along to the axial direction.

8. The control valve of claim 7, wherein the cycle of the pressurization of each channel of the system is adjustable by adjusting the positioning of the magnets.

9. The control valve of claim 7, wherein maximum pressure of each channel of the system is adjustable by adjusting a valve adapted to control the fluid flow rate into the input port.

10. The control valve of claim 7, wherein the cycle of the pressurization of each channel of the system is adjustable by adjusting a valve adapted to control the vent rate of the system.

11. The control valve of claim 6 further including adjustment screws for the adjustment of the axial position of the magnets.

12. The control valve of claim 6 further including first and second stop members disposed respectively within the first and the second chamber for limiting the terminal positions of the piston member.

13. The control valve of claim 12, wherein the first and second stop members are protrusions extending axially from the respective first and second casing ends.

14. The control valve of claim 1 further including a seal disposed between the casing and the piston member.

15. The control valve of claim 14, wherein the seal includes three O-ring members, a first one disposed adjacent to an intermediate location of the piston member, and a second and a third ones disposed respectively adjacent to each end of the piston member.

16. The control valve of claim 15, wherein the O-ring members are moveable to the axial direction along the piston member upon axial movement of the piston member.

17. The control valve of claim 16, wherein the first O-ring member is rollable between a position located on the left of the input port and a position located on the right of the input port, the second O-ring member is rollable between a position located on the left of the first vent port and a position located on the right of the first vent port, and the third O-ring member is rollable between a position located on the left of the second vent port and a position located on the right of the second vent port.

18. The control valve of claim 16, wherein the O-ring members are rollable within grooves provided along the circumference of the piston member.

19. The control valve of claim 1, wherein the hollow casing and the piston member are made of plastic material.

20. The control valve of claim 1, wherein the hollow casing and the piston member are made of metal.

21. The control valve of claim 1, wherein the operating fluid is air.

22. A fluid operated control valve for controlling fluid flow of a system, the control valve comprising:

a hollow casing with closed first and second ends;

a piston member slidably disposed within the casing and defining thereby within the casing a first chamber and a second chamber, each chamber having a volume variable depending upon the position of the piston member;

a first magnetic member disposed adjacent the first casing end for attracting the piston member to a first terminal position;

a second magnetic member disposed adjacent the second casing end for attracting the piston member to a second terminal position;

an input port disposed adjacent to an intermediate location in the casing for receiving operating fluid thereto;

a first output port disposed in the casing in fluid communication with the first chamber;

a second output port disposed in the casing in fluid communication with the second chamber; and a passageway for alternately guiding the operating fluid from the input port to the first chamber and the second chamber depending upon the position of the piston member within the casing, the position of the piston being reciprocally moveable between the two terminal positions when a pressurizing chamber reaches a maximum pressure overcoming attracting force between the piston member and the one then-holding magnetic member.

23. A fluid operated control valve for controlling fluid flow of a system, the control valve comprising:

a hollow casing with closed first and second ends;

a piston member slidably disposed within the casing and defining thereby within the casing a first chamber and a second chamber, each chamber having a volume variable depending upon the position of the piston member;

a first magnetic member disposed adjacent the first casing end for attracting the piston member to a first terminal position;

a second magnetic member disposed adjacent the second casing end for attracting the piston member to a second terminal position;

an input port disposed adjacent to an intermediate location in the casing for receiving operating fluid thereto;

a first output port disposed in the casing in fluid communication with the first chamber;

a second output port disposed in the casing in fluid communication with the second chamber; and a passageway for alternately guiding the operating fluid from the input port to the first chamber and the second chamber depending upon the position of the piston member within the casing, the position of the piston being reciprocally moveable between the two terminal positions when a venting chamber reaches a minimum pressure.

24. An amenity system for use with a fluid source for providing operating fluid to the system, comprising:

an amenity member including a first and a second fluid channels therein; and a control valve disposed in fluid communication with the fluid source and the fluid channels of the amenity member and for alternately inflating and deflating the fluid channels, the control valve including:

a hollow casing with closed first and second ends;

a piston member slidably disposed within the casing and defining thereby within the casing a first chamber adjacent to the first end of the casing and a second chamber adjacent to the second end of the casing, each chamber having a volume variable depending upon the position of the piston member;

a first magnetic member disposed adjacent the first chamber for attracting the piston member to a first terminal position;

a second magnetic member disposed adjacent the second chamber for attracting the piston member to a second terminal position;

an input port disposed adjacent to an intermediate location in the casing for receiving the operating fluid thereto from the fluid source;

a first output port disposed in the first chamber in fluid communication with the first chamber and the first fluid channel of the amenity member;

a second output port disposed in the second chamber in fluid communication with the second chamber and the second fluid channel of the amenity member; and a passageway for alternately guiding the operating fluid from the input port to the first chamber and the second chamber depending upon the position of the piston member within the casing, the position of the piston being reciprocally moveable between the two terminal positions when pressure difference between a pressurizing chamber and the other chamber reaches a pressure overcoming attracting force between the piston member and the one then-holding magnetic mating member, thereby allowing alternate pressurizing of the fluid channels of the amenity member.

25. The amenity system of claim 24 further including a first vent port disposed between the input port and the first output port, and a second vent port disposed between the input port and the second output port, respectively, for venting fluid from the chambers.

26. The amenity system of claim 24 utilized for a bed pad system.

27. The amenity system of claim 26, wherein the amenity member is a bed pad.

28. The amenity system of claim 24 utilized for a seat pad system.

29. The amenity system of claim 28, wherein the amenity member is a seat pad.

30. The amenity system of claim 24, wherein the passageway of the control valve includes a pair of conduits disposed in the piston member for the alternate guiding of the fluid.

* * * * *